(12) United States Patent
Hurley et al.

(10) Patent No.: US 12,071,117 B2
(45) Date of Patent: Aug. 27, 2024

(54) BRAKING CONTROL APPARATUS AND METHOD FOR USE IN AN ASSOCIATED MULTIPLE-STEER VEHICLE

(71) Applicant: Bendix Commercial Vehicle Systems LLC, Avon, OH (US)

(72) Inventors: Ryan S. Hurley, Lakewood, OH (US); James M. Cooper, Jr., Independence, OH (US); Jereme C. Morrow, Highland Village, TX (US); Deepak K. Komandur, San Mateo, CA (US); Nirav K. Parikh, North Ridgeville, OH (US); Subashish Sasmal, Avon, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 0 days.

(21) Appl. No.: 18/162,390

(22) Filed: Jan. 31, 2023

(65) Prior Publication Data
US 2024/0253605 A1 Aug. 1, 2024

(51) Int. Cl.
*B60T 8/1769* (2006.01)
*B60T 8/172* (2006.01)
*B60T 13/68* (2006.01)

(52) U.S. Cl.
CPC ............ *B60T 8/1769* (2013.01); *B60T 8/172* (2013.01); *B60T 13/683* (2013.01); *B60T 2270/10* (2013.01)

(58) Field of Classification Search
CPC ...... B60T 8/1769; B60T 8/172; B60T 13/683; B60T 2270/10
See application file for complete search history.

(56) References Cited

U.S. PATENT DOCUMENTS

| | | | | |
|---|---|---|---|---|
| 5,130,928 A | * | 7/1992 | Petersen | B60K 23/0808 180/197 |
| 5,462,342 A | * | 10/1995 | Goebels | B60T 13/683 303/118.1 |
| 6,513,885 B1 | * | 2/2003 | Salamat | B60T 8/1703 303/DIG. 9 |

(Continued)

FOREIGN PATENT DOCUMENTS

| | | |
|---|---|---|
| DE | 4227084 A1 | 2/1994 |
| DE | 102004009466 A1 | 9/2005 |

(Continued)

*Primary Examiner* — Carl C Staubach
(74) *Attorney, Agent, or Firm* — Tucker Ellis LLP

(57) ABSTRACT

A braking control apparatus for use in an associated multiple-steer vehicle having first and second steerable axles and a plurality of drive axles effects axle-by-axle braking control of steerable wheel brakes of the steerable axles and wheel-by-wheel braking control of drive wheel brakes of the drive axles, respectively, to perform a braking operation in the associated multiple-steer vehicle. The axle-by-axle braking control of the steerable wheel brakes and the wheel-by-wheel braking control of the drive wheel brakes are simultaneously effected to decelerate the vehicle using both the steerable and drive wheel brakes so that the ability to steer the vehicle is not adversely affected should one or more of the steerable wheel brakes on any of the steerable axles experience slippage, skidding, or lockup during the braking or deceleration.

22 Claims, 9 Drawing Sheets

(56) References Cited

U.S. PATENT DOCUMENTS

| | | | |
|---|---|---|---|
| 6,935,707 B2 | 8/2005 | Ruhnau et al. | |
| 7,520,572 B2* | 4/2009 | Hatipoglu | B60T 15/045 |
| | | | 303/3 |
| 7,866,761 B2 | 1/2011 | Gerum et al. | |
| 8,979,217 B2* | 3/2015 | Steinberger | B60T 8/343 |
| | | | 303/7 |
| 9,043,071 B1* | 5/2015 | Lombrozo | B62D 9/007 |
| | | | 701/72 |
| 9,315,179 B2 | 4/2016 | Herges et al. | |
| 10,093,293 B2 | 10/2018 | Lulfing | |
| 10,562,510 B2 | 2/2020 | Woerner et al. | |
| 11,130,541 B2* | 9/2021 | Nagasaka | B62K 5/027 |
| 11,584,381 B2* | 2/2023 | Sung | B60W 10/20 |
| 11,926,302 B2* | 3/2024 | Michaelsen | B60T 8/343 |
| 2014/0379220 A1* | 12/2014 | Lee | B60W 10/18 |
| | | | 701/41 |
| 2021/0370898 A1* | 12/2021 | Eckert | B60T 8/1708 |

FOREIGN PATENT DOCUMENTS

| | | |
|---|---|---|
| DE | 102010056304 A1 | 6/2012 |
| FR | 2488844 A1 | 2/1982 |
| FR | 2519919 A1 | 7/1983 |
| GB | 2270130 A | 3/1994 |
| WO | 2021160567 A1 | 8/2021 |

* cited by examiner

BRAKING CONTROL APPARATUS AND METHOD FOR USE IN AN ASSOCIATED MULTIPLE-STEER VEHICLE

TECHNICAL FIELD

The present application relates to brake systems and methods and, in particular, to braking systems, methods, and apparatus for use in implementing braking control in associated multiple-steer vehicles having a plurality of steerable axles.

BACKGROUND

Specialized brake systems in large commercial vehicles are known in general. For example, brake systems are provided for vehicles that have a plurality of rear drive axles and a front steerable axle. As an example, DE 199 23 455 A1 discloses an electronically controlled brake system that includes a front-axle brake circuit having a 1-channel pressure regulating module for regulating brake pressures in wheel brakes of the front steerable axle of the vehicle, and that also includes a rear-axle brake circuit having a 2-channel pressure regulating module for regulating the brake pressures in wheel brakes of the rear drive axles of the vehicle, wherein a so-called electronic brake system (EBS) is achieved. The pressure regulating modules are electrically controlled by electric signals received by the system from a foot brake module. The pressure regulating modules in general include a dedicated electronic control unit, an inlet valve, an outlet valve, a relay valve, and a back-up valve. A pressure sensor may be used in order to be able to adjust in terms of a pressure regulation an actual pneumatic brake pressure that is measured with the aid of a pressure sensor to a desired brake pressure that is set in response to a request from the driver.

In addition, U.S. Pat. No. 9,315,179 discloses a system and method for controlling a brake system of a vehicle with an electronically regulated rear-axle brake circuit and an pneumatically controlled front-axle brake circuit.

While these systems are generally effective in many applications, some particularly large and/or specialty vehicles have more than a single steerable axle at the front of the vehicle, in addition to a plurality of drive axles at the rear. These are so-called "multiple-steer" vehicles. In general, vehicles having a two (2) steerable axles are sometimes referred to as "dual-steer" vehicles, and vehicles having two (2) or more steerable axles are often referred to as "multiple-steer" vehicles.

It is desirable to provide braking systems, methods, and apparatus for use in such associated multiple-steer vehicles.

SUMMARY

In accordance with an aspect, the disclosure herein relates to a braking control apparatus for use in associated multiple-steer vehicles having first and second steerable axles and a plurality of drive axles. The braking control apparatus includes an electronic control unit (ECU) configured to receive a vehicle braking signal to effect a braking operation in the associated vehicle, and first and second apparatus operatively coupled with the ECU, wherein the first and second apparatus are configured to react to braking control signals generated by the ECU for applying brakes of the associated multiple-steer vehicle. The first apparatus is responsive to control signals received from the ECU to effect braking control of brakes on steerable wheels of the first and second steerable axles of the associated vehicle. The second apparatus is responsive to control signals received from the ECU to effect braking control of brakes of drive wheels of the plurality of drive axles of the associated vehicle. In accordance with an aspect, the braking control apparatus operates to effect braking control of the steerable wheels of the first and second steerable axles of the associated vehicle in coordination with braking control of the drive wheels of the plurality of drive axles.

In any of the implementations, the braking control apparatus operates to effect braking control of the associated vehicle differently as between the first and second steerable axles and the plurality of drive axles.

In any of the implementations, the braking control apparatus operates to effect braking control of the steerable wheels of the first and second steerable axles of the associated vehicle using axle-by-axle control in coordination with wheel-by-wheel braking control of the drive wheels of the plurality of drive axles, wherein the axle-by-axle control effects braking control of the steerable wheels of the first steerable axle mutually together, braking control of the steerable wheels of the second steerable axle mutually together, and braking control of the steerable wheels of the first and second steerable axles separately relative to each other, and wherein the wheel-by-wheel control effects braking control of the drive wheels on a first side of the vehicle mutually together, braking control of the drive wheels on a second side of the vehicle opposite from the first side of the vehicle mutually together, and braking control of the drive wheels on the opposite first and second sides of the vehicle separately relative to each other.

In any of the implementations, the braking control apparatus operates to effect braking control of the steerable wheels of the first and second steerable axles of the associated vehicle using axle-by-axle control simultaneously and in coordination with wheel-by-wheel braking control of the drive wheels of the plurality of drive axles.

In accordance with an aspect, the disclosure herein relates to a braking control apparatus for use in associated multiple-steer vehicles having first and second steerable axles and a drive axle. In accordance with a particular aspect, the disclosure herein relates to a braking control apparatus for use in associated multiple-steer vehicles having first and second steerable axles and a plurality of drive axles. The braking control apparatus includes an electronic control unit (ECU), and first and second electro-pneumatic modules (EPMs) operatively coupled with the ECU, wherein the ECU generates braking control signals that the first and second EPMs react to for applying brakes of the associated multiple-steer vehicles differently as between the first and second steerable axles and the plurality of drive axles. The first EPM is responsive to control signals received from the ECU to effect braking control of brakes at steerable wheels of the first and second steerable axles of the associated vehicle, and the second EPM is responsive to control signals received from the ECU to effect braking control of brakes at drive wheels of the plurality of drive axles of the associated vehicle.

In an implementation, the first EPM is responsive to steerable wheel brake control signals received from the ECU to effect axle-by-axle braking control of brakes at steerable wheels of the first and second steerable axles of the associated vehicle, and the second EPM is responsive to drive wheel brake control signals received from the ECU to effect wheel-by-wheel braking control of brakes at drive wheels of the plurality of drive axles of the associated vehicle. In this way and advantageously, the braking control of the brakes at the steering axles of the associated vehicle are controlled on an axle-by-axle basis, and the braking control of the brakes at the drive axles of the associated vehicle are controlled on a wheel-by-wheel basis.

In any of the implementations, the first EPM is responsive to the steerable wheel brake control signals received from the ECU to effect the axle-by-axle braking control of brakes at the steerable wheels of the first and second steerable axles of the associated vehicle by selectively delivering pressurized air to a first brake group of two or more brakes on a first steerable axle of the associated vehicle separately from a second brake group of two or more brakes on a second steerable axle of the associated vehicle different from the first steerable axle of the associated vehicle.

In any of the implementations, the second EPM is responsive to the drive wheel brake control signals received from the ECU to effect the wheel-by-wheel braking control of the brakes at the drive wheels of the plurality of drive axles of the associated vehicle by selectively delivering pressurized air to a third brake group of two or more brakes on a first side of the associated vehicle separately from a fourth brake group of two or more brakes on a second side of the associated vehicle opposite from the first side of the associated vehicle.

In any of the implementations, a processor device of the braking control apparatus executes brake control logic stored in a non-transitory memory device to generate the steerable wheel brake control signals and the drive wheel brake control signals for effecting the axle-by-axle and the wheel-by-wheel braking control of the steerable wheels and the drive wheels of the associated vehicle, respectively.

In any of the implementations, the first EPM of the braking control system includes a first multi-channel EPM, and the second EPM includes a second multi-channel EPM.

In any of the implementations, the first multi-channel EPM of the braking control system includes a first 2-channel EPM, and the second multi-channel EPM of the braking control system includes a second 2-channel EPM.

In any of the implementations, a first channel of the first 2-channel EPM is configured to control a first brake group of two or more steerable wheel brakes on the first steerable axle of the associated vehicle in mutual coordination in response to the steerable wheel brake control signal received from the ECU, and a second channel of the first 2-channel EPM is configured to control a second brake group of two or more steerable wheel brakes on the second steerable axle of the associated vehicle in mutual coordination in response to the steerable wheel brake control signal received from the ECU.

In any of the implementations, a first channel of the second 2-channel EPM is configured to control a third brake group of two or more drive wheel brakes on the first side P of the associated vehicle in mutual coordination in response to the drive wheel brake control signal received from the ECU, and a second channel of the second 2-channel EPM is configured to control a fourth brake group of two or more drive wheel brakes on the second side D of the associated vehicle in mutual coordination in response to the drive wheel brake control signal received from the ECU. The first side of the vehicle P may be for example the passenger side of the vehicle, and the second side of the vehicle D may be for example the driver side of the vehicle, wherein the first (passenger's) and second (driver's) sides are on opposite sides of the vehicle.

In any of the implementations, the first EPM of the braking control system includes a first 2-channel EPM disposed in a single housing, and the second EPM of the braking control system includes a second 2-channel EPM disposed in a single housing.

In any of the implementations, the first and second EPMs of the braking control system include first and second 2-channel EPMs disposed in a common or shared single housing.

In any of the implementations, the first and second EPMs of the braking control system include first and second 2-channel EPMs disposed in the same single housing.

In any of the implementations, the braking control system includes a first set of two or more pressure control valves (PCVs) in pneumatic communication with the first EPM. In the implementation, the first set of two or more PCVs is responsive to first anti-lock braking system (ABS) signals received from the ECU to selectively interrupt delivery of the pressurized air from the first EPM to the first brake group of two or more steerable wheel brakes on the first steerable axle of the associated vehicle.

In any of the implementations, the braking control system includes a second set of two or more PCVs in pneumatic communication with the first EPM, the second set of two or more PCVs being responsive to second ABS signals received from the ECU to selectively interrupt delivery of the pressurized air from the first EPM to the second brake group of two or more steerable wheel brakes on the second steerable axle of the associated vehicle.

In any of the implementations, the first EPM of the braking control system is responsive to the steerable wheel brake control signal received from the ECU to effect axle-by-axle braking control of the steerable wheel brakes of the first and second steerable axles of the associated vehicle by selectively delivering the pressurized air to the first brake group of two or more steerable wheel brakes separately from selectively delivering the pressurized air to the second brake group of two or more steerable wheel brakes for effecting the axle-by-axle braking control of the steerable wheel brakes of the first steerable axle of the associated vehicle separately from effecting the axle-by-axle braking control of the steerable wheel brakes of the second steerable axle of the associated vehicle.

In any of the implementations, the first EPM of the braking control system is responsive to the steerable wheel brake control signal received from the ECU to effect axle-by-axle braking control of the steerable wheel brakes of the first and second steerable axles of the associated vehicle by simultaneously selectively delivering the pressurized air to the first brake group of two or more steerable wheel brakes on the first axle separately from selectively delivering the pressurized air to the second brake group of two or more steerable wheel brakes on the second axle for simultaneously effecting the axle-by-axle braking control of the steerable wheel brakes of the first steerable axle of the associated vehicle separately from effecting the axle-by-axle braking control of the steerable wheel brakes of the second steerable axle of the associated vehicle.

In any of the implementations, the brake control logic stored in the memory device of the braking control system incudes axle-by-axle braking control logic and wheel-by-wheel braking control logic. The axle-by-axle braking control logic is executable by the processor device to generate the steerable wheel brake control signal for performing the axle-by-axle braking control of the steerable wheel brakes of the first and second steerable axles of the associated vehicle. The wheel-by-wheel braking control logic is executable by the processor device to generate the drive wheel brake control signal for performing the wheel-by-wheel braking control of the drive wheel brakes of the plurality of drive axles of the associated vehicle.

In any of the implementations, the braking control apparatus further includes anti-lock braking system (ABS) brake control logic stored in the memory device. The ABS brake control logic is executable by the processor device to generate first anti-lock braking system (ABS) signals for effecting ABS braking control over the first brake group of two or more steerable wheel brakes on the first steerable axle of the associated vehicle. The braking control apparatus further includes a first set of two or more pressure control valves (PCVs) in pneumatic communication with the first EPM, the first set of two or more PCVs are responsive to the first anti-lock braking system (ABS) signals received from the ECU to selectively interrupt delivery of the pressurized air from the first EPM to the first brake group of two or more steerable wheel brakes on the first steerable axle of the associated vehicle.

In any of the implementations, the anti-lock braking system (ABS) brake control logic is executable by the processor device to generate second ABS signals for effecting ABS braking control over the second brake group of two or more steerable wheel brakes on the second steerable axle of the associated vehicle.

In any of the implementations, the braking control apparatus further includes a second set of two or more PCVs in pneumatic communication with the first EPM. The second set of two or more PCVs is responsive to the second ABS signals received from the ECU to selectively interrupt delivery of the pressurized air from the first EPM to the second brake group of two or more steerable wheel brakes on the second steerable axle of the associated vehicle.

In accordance with an aspect, a braking control method is provided for performing a braking operation in an associated multiple-steer vehicle having first and second steerable axles and a drive axle. In accordance with a particular aspect, a braking control method is provided for performing a braking operation in an associated multiple-steer vehicle having first and second steerable axles and a plurality of drive axles. The braking control method in accordance with an aspect comprises effecting axle-by-axle braking control of steerable wheel brakes of the first and second steerable axles of the associated vehicle, and wheel-by-wheel braking control of drive wheel brakes of the plurality of drive axles of the associated vehicle.

In any of the implementations, the effecting the axle-by-axle braking control of the steerable wheel brakes of the first and second steerable axles of the associated vehicle comprises selectively delivering the pressurized air to a first brake group of two or more steerable wheel brakes on the first steerable axle of the associated vehicle, and selectively delivering the pressurized air to a second brake group of two or more steerable wheel brakes on the second steerable axle of the associated vehicle different from the first steerable axle of the associated vehicle.

In any of the implementations, the effecting the wheel-by-wheel braking control of the drive wheel brakes of the plurality of drive axles of the associated vehicle comprises selectively delivering pressurized air to a third brake group of two or more drive wheel brakes on a first side of the associated vehicle, and selectively delivering the pressurized air to a fourth brake group of two or more drive wheel brakes on a second side of the associated vehicle opposite from the first side of the associated vehicle.

In any of the implementations, the braking control method further includes receiving a vehicle braking signal by an electronic control unit (ECU) that includes a processor device, a non-transitory memory device operatively coupled with the processor device, and brake control logic stored in the memory device, wherein the received vehicle braking signal is representative of the braking operation to be performed by the associated vehicle. In an implementation, the brake logic is executed by the processor device to perform the braking operation in the associated multiple-steer vehicle based on the received vehicle braking signal. The executing the brake control logic by the processor device to perform the braking operation in the associated multiple-steer vehicle based on the received vehicle braking signal includes generating a steerable wheel brake control signal to effect the axle-by-axle braking control of the steerable wheel brakes of the first and second steerable axles of the associated vehicle, and generating a drive wheel brake control signal to effect the wheel-by-wheel braking control of the drive wheel brakes of the plurality of drive axles of the associated vehicle.

In any of the implementations, the effecting the axle-by-axle control of the steerable wheel brakes includes effecting the axle-by-axle control of the steerable wheel brakes by a first EPM operable in response to the steerable wheel brake control signal.

In any of the implementations, the effecting the wheel-by-wheel braking control of the drive wheel brakes includes effecting the wheel-by-wheel braking control of the drive wheel brakes by a second EPM operable in responsive to the drive wheel brake control signal.

In any of the implementations, the effecting the axle-by-axle control of the steerable wheel brakes of the braking control method incudes effecting the axle-by-axle control of the steerable wheel brakes by a first multi-channel EPM operable in response to the steerable wheel brake control signal.

In any of the implementations, the effecting the wheel-by-wheel braking control of the drive wheel brakes of the braking control method includes effecting the wheel-by-wheel braking control of the drive wheel brakes by a second multi-channel EPM operable in responsive to the drive wheel brake control signal.

In any of the implementations, the effecting the axle-by-axle control of the steerable wheel brakes of the braking control method incudes effecting the axle-by-axle control of the steerable wheel brakes by a first 2-channel EPM operable in response to the steerable wheel brake control signal.

In any of the implementations, the effecting the wheel-by-wheel braking control of the drive wheel brakes of the braking control method includes effecting the wheel-by-wheel braking control of the drive wheel brakes by a second 2-channel EPM operable in responsive to the drive wheel brake control signal.

In any of the implementations, the effecting the axle-by-axle control of the steerable wheel brakes of the braking control method includes controlling using a first channel of the first 2-channel EPM the first brake group of two or more steerable wheel brakes on the first steerable axle of the associated vehicle in mutual coordination, and controlling using second channel of the first 2-channel EPM the second brake group of two or more steerable wheel brakes on the second steerable axle of the associated vehicle in mutual coordination.

In any of the implementations, the effecting the wheel-by-wheel includes controlling using a first channel of the second 2-channel EPM the third brake group of two or more drive wheel brakes on the first side P of the associated vehicle in mutual coordination, and controlling using a second channel of the second 2-channel EPM the fourth brake group of two or more drive wheel brakes on the second side D of the associated vehicle in mutual coordination.

In any of the implementations, the braking control method further includes executing anti-lock braking system (ABS) brake control logic stored in the memory device by the processor device to generate first anti-lock braking system (ABS) signals for effecting ABS braking control over the first brake group of two or more steerable wheel brakes on the first steerable axle of the associated vehicle, and selectively interrupting based on the first anti-lock braking system (ABS) signals delivery of the pressurized air from the first EPM to the first brake group of two or more steerable wheel brakes on the first steerable axle of the associated vehicle using a first set of two or more pressure control valves (PCVs) in pneumatic communication with the first EPM.

In any of the implementations, the braking control method further includes executing the anti-lock braking system (ABS) brake control logic stored in the memory device by the processor device to generate second ABS signals for effecting ABS braking control over the second brake group of two or more steerable wheel brakes on the second steerable axle of the associated vehicle, and selectively interrupting based on the second ABS signals delivery of the pressurized air from the first EPM to the second brake group of two or more steerable wheel brakes on the second steerable axle of the associated vehicle using a second set of two or more PCVs in pneumatic communication with the first EPM.

In any of the implementations, the braking control method further includes executing axle-by-axle braking control logic by the processor device to generate the steerable wheel brake control signal for performing the axle-by-axle braking control of the steerable wheel brakes of the first and second steerable axles of the associated vehicle, and executing wheel-by-wheel braking control logic by the processor device to generate the drive wheel brake control signal for performing the wheel-by-wheel braking control of the drive wheel brakes of the plurality of drive axles of the associated vehicle.

In any of the implementations, the effecting the axle-by-axle braking control of steerable wheel brakes of the first and second steerable axles of the braking control method includes selectively delivering the pressurized air to the first brake group of two or more steerable wheel brakes on the first steerable axle of the associated vehicle separately from selectively delivering the pressurized air to the second brake group of two or more steerable wheel brakes on the second steerable axle of the associated vehicle for effecting the axle-by-axle braking control of the steerable wheel brakes of the first steerable axle of the associated vehicle separately from effecting the axle-by-axle braking control of the steerable wheel brakes of the second steerable axle of the associated vehicle.

In any of the implementations, the effecting the axle-by-axle braking control of the steerable wheel brakes of the first and second steerable axles of the braking control method includes simultaneously selectively delivering the pressurized air to the first brake group of two or more steerable wheel brakes on the first steerable axle of the associated vehicle separately from selectively delivering the pressurized air to the second brake group of two or more steerable wheel brakes on the second steerable axle of the associated vehicle for simultaneously effecting the axle-by-axle braking control of the steerable wheel brakes of the first steerable axle of the associated vehicle separately from effecting the axle-by-axle braking control of the steerable wheel brakes of the second steerable axle of the associated vehicle.

The various examples described above can be combined with each other in further examples.

It is to be understood that the features mentioned above and those yet to be explained below may be used not only in the respective combinations indicated, but also in other combinations or in isolation without departing from the scope of the invention.

Other aspects, embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which are shown, by way of illustration, exemplary embodiments illustrating the principles of the disclosed braking control apparatus and method and how they are practiced. Other embodiments can be utilized to practice the disclosed braking control apparatus and method and structural and functional changes can be made thereto without departing from the scope of the disclosure.

Figure 1:
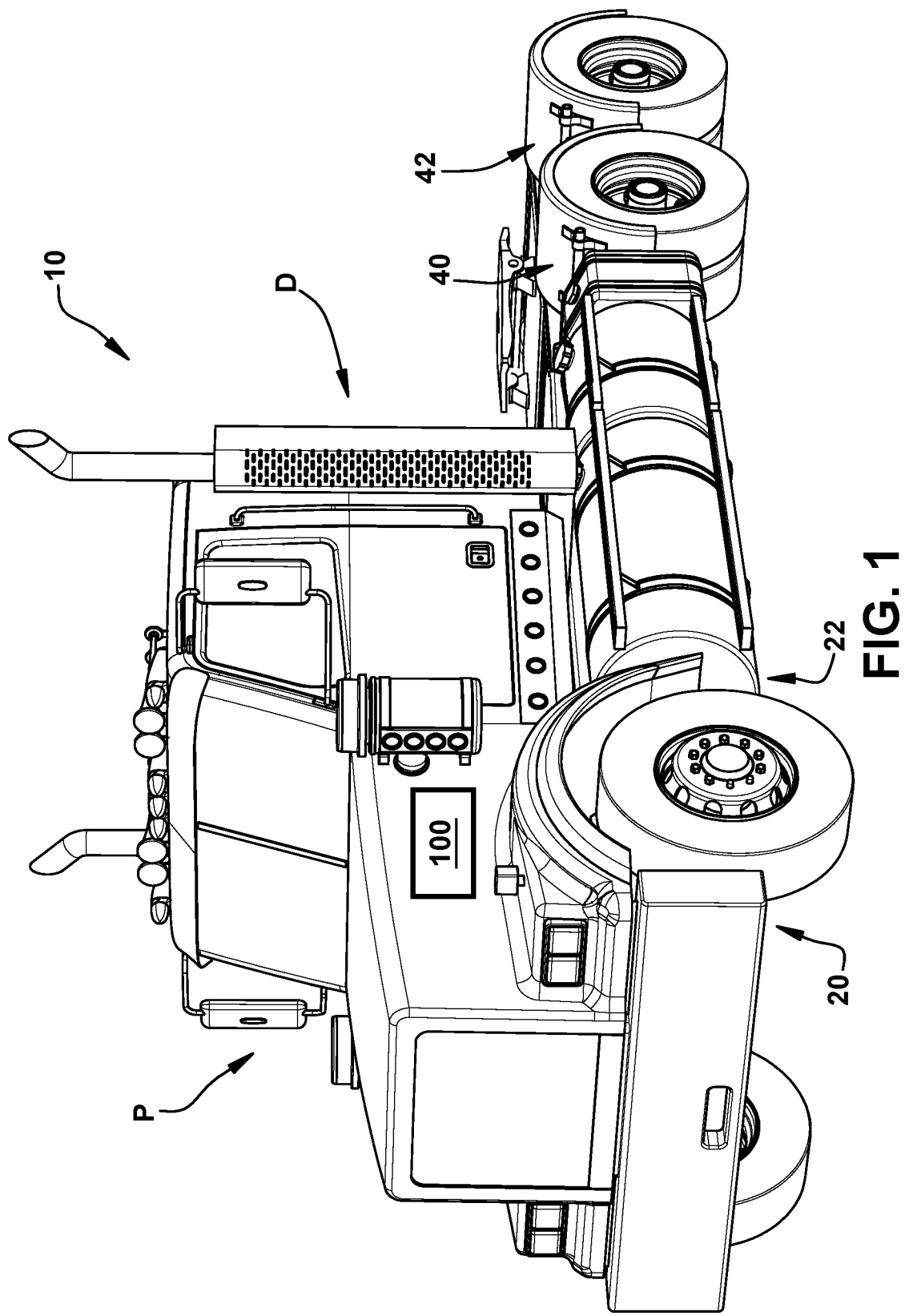
FIG. 1 is a perspective view of a representative multiple-steer vehicle illustrating an application of a braking control apparatus in accordance with an example embodiment of the present disclosure.

Referring now to the drawings, wherein the showings are for the purpose of illustrating the example embodiments only, and not for purposes of limiting the same, FIG. 1 is a perspective view of a representative multiple-steer vehicle 10 illustrating an application of a braking control apparatus 100 in accordance with an example embodiment of the present disclosure. The representative multiple-steer vehicle 10 has first and second steerable axles 20, 22 and a driver axle. In the example shown, the representative multiple-steer vehicle 10 has first and second steerable axles 20, 22 and a plurality of drive axles 40, 42. In the illustrated example, the representative multiple-steer vehicle 10 has tandem, i.e. two (2), drive axles. Further in the illustrated example, the vehicle has a pair, i.e. two (2), steerable axles and, as such, is commonly referred to as a "dual steer" vehicle. It is to be appreciated, however, that the multiple-steer vehicle 10 illustrated is merely representative of a vehicular application of the braking control apparatus 100 in accordance with an example embodiment of the present disclosure, and that the braking control apparatus 100 may be applied in any other vehicle having two or more steerable axles, i.e. a "multiple-steer vehicle," and, in particular, the braking control apparatus 100 may be applied in any other vehicle having two or more steerable axles and two or more drive axles.

According to principles of the example embodiments herein, the braking control apparatus 100 is configured to perform a braking operation in associated vehicles of any type that have multiple steerable axles and, in particular, in vehicles that have multiple steerable axles and a plurality of drive axles. In the example illustrated, the braking control apparatus 100 is configured to perform a braking operation in an associated vehicle 10 (FIG. 1) having a pair of steerable axles 20, 22 and a pair of drive axles 40, 42. In the particular example illustrated, the braking control apparatus 100 is configured to perform a braking operation in an associated vehicle 10 (FIG. 1) having two (2) steerable axles 20, 22, and two (2) drive axles 40, 42.

According to further principles of the example embodiment as illustrated, the braking control apparatus 100 is configured to effect axle-by-axle braking control of steerable wheel brakes of the first and second steerable axles 20, 22 of the associated vehicle 10, and wheel-by-wheel braking control of drive wheel brakes of the plurality of drive axles 40, 42 of the associated vehicle.

According to further principles of the example embodiment as illustrated, the braking control apparatus 100 is configured to effect axle-by-axle braking control of steerable wheel brakes of the first and second steerable axles 20, 22 of the associated vehicle 10 by selectively delivering the pressurized air to a first brake group of two or more steerable wheel brakes on the first steerable axle 20 of the associated vehicle 10, and selectively deliver the pressurized air to a second brake group of two or more steerable wheel brakes on the second steerable axle 22 of the associated vehicle 10 different from the first steerable axle 20 of the associated vehicle 10. In this way, the ability to steer the vehicle is not adversely affected should one or more of the steerable wheel brakes on any of the steerable axles experience slippage, skidding, lockup or the like during deceleration operations.

According to further principles of the example embodiment as illustrated, the braking control apparatus 100 is configured to effect the wheel-by-wheel braking control of the drive wheel brakes of the plurality of drive axles 40, 42 of the associated vehicle 10 by selectively delivering pressurized air to a third brake group of two or more drive wheel brakes on a first side P of the associated vehicle, and to selectively deliver the pressurized air to a fourth brake group of two or more drive wheel brakes on a second side D of the associated vehicle 10 opposite from the first side P of the associated vehicle.

According to further principles of the example embodiment as illustrated, the braking control apparatus 100 is configured to effect the axle-by-axle braking control of the steerable wheel brakes of the first and second steerable axles 20, 22 of the associated vehicle 10 while simultaneously effecting the wheel-by-wheel braking control of the drive wheel brakes of the plurality of drive axles 40, 42 of the associated vehicle 10.

Figure 2:
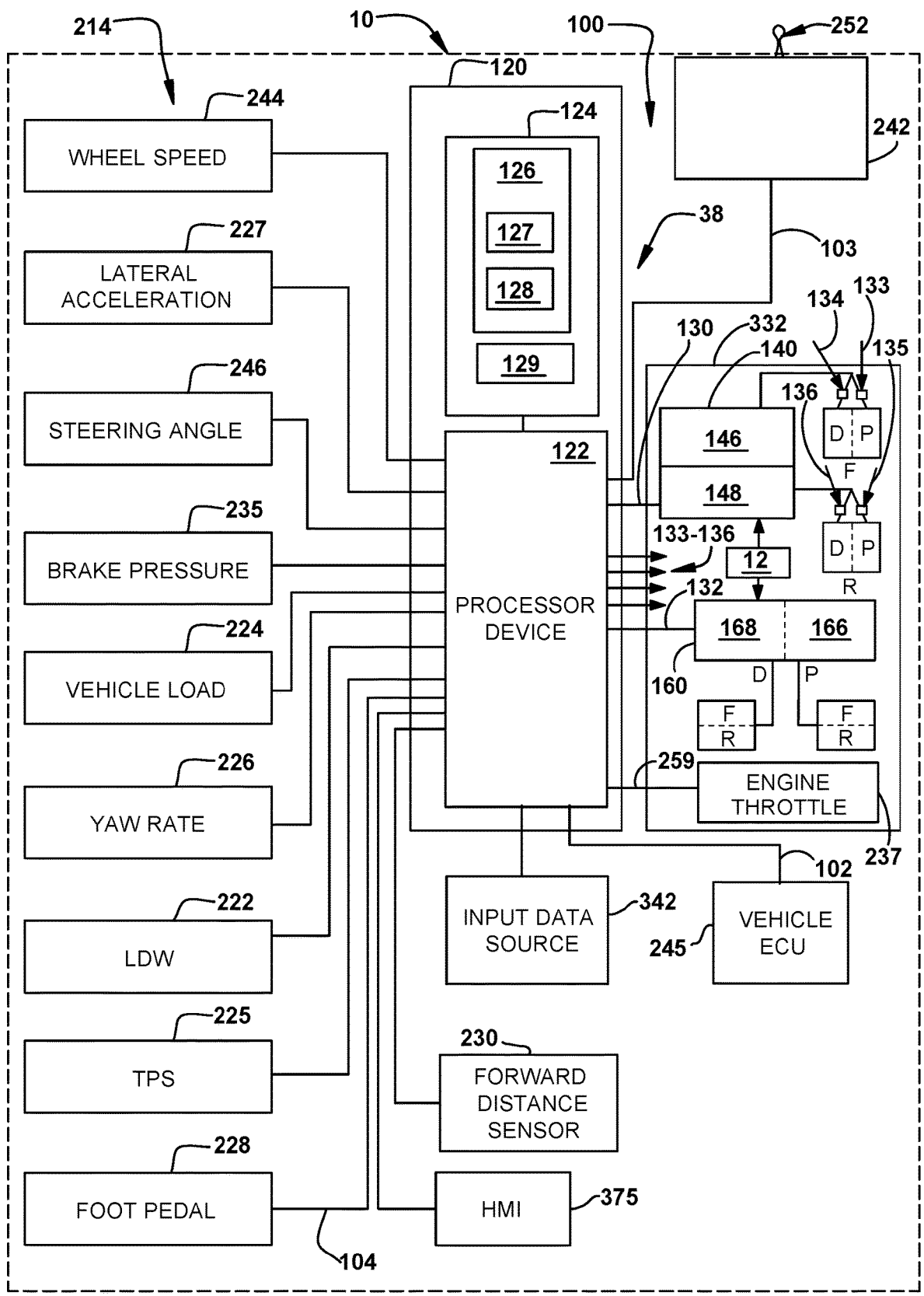
FIG. 2 is a schematic block diagram depiction that illustrates details of the braking control apparatus of FIG. 1 in accordance with an example embodiment.

FIG. 2 is a schematic block diagram depiction that illustrates details of the braking control apparatus 100 of FIG. 1 disposed in a vehicle 10 in accordance with an example embodiment. According to principles of the example embodiment as illustrated, the braking control apparatus 100 may be adapted to detect, monitor, and report a variety of operational parameters and conditions of the vehicle 10 and/or the driver's interaction therewith. The braking control apparatus 100 may be adapted to receive one or more vehicle braking signals 102 from an electronic control unit (ECU) 245 of the vehicle 10, and/or to receive one or more vehicle braking signals 103 via a transceiver 242 from an associated remote source such as another vehicle or remote control system, and/or to receive one or more vehicle braking signals 104 from an operator foot pedal 228 located in the cab of the vehicle 10. The braking control apparatus 100 may be adapted to effect a braking operation in the associated vehicle 10 based on one or more or all of the vehicle braking signals 102, 103, and/or 104 as may be needed or desired such as, for example, to maintain vehicle stability, to maintain a following distance of the vehicle 10 relative to other vehicles within a platoon, to regulate deceleration of the vehicle, to slow and/or stop the vehicle, etc.

The braking control apparatus 100 is adapted to effect, based on received one or more or all of the vehicle braking signals 102, 103, and/or 104 wheel-by-wheel braking control of drive wheel brakes of the plurality of drive axles 40, 42 of the associated vehicle and, further, to effect, based on received one or more or all of the vehicle braking signals 102, 103, and/or 104 axle-by-axle braking control of steerable wheel brakes of the first and second steerable axles 20, 22 of the associated vehicle 10.

In axle-by-axle braking control and in accordance with the present disclosure, steerable wheel brakes on a first steerable axle 20 of the associated vehicle 10 are controlled as a set or group separately relative to steerable wheel brakes on a second steerable axle 22 of the associated vehicle 10, wherein the first and second steerable axles 20, 22 of the associated vehicle 10 are different steerable axles. Without in any way limiting the scope, interpretation, or application of the claims appearing below, a desirable technical effect of one or more of the example embodiments disclosed herein is that the ability to decelerate the vehicle while simultaneously needing to steer the vehicle is not adversely affected should one or more of the steerable wheel brakes on any of the steerable axles experience slippage, skidding, lockup or the like during deceleration operations because the steerable wheel brakes on the axle that has brakes that are not slipping would adequately provide the necessary rolling contact with the surface underlying the vehicle to provide the steering capability.

On the other hand and in accordance with the present disclosure, in wheel-by-wheel braking control and in accordance with the present disclosure, drive wheel brakes of the plurality of drive axles 40, 42 of the associated vehicle on the first side P of the associated vehicle 10 are controlled as a set or group separately relative to drive wheel brakes of the plurality of drive axles 40, 42 of the associated vehicle on the second side D of the associated vehicle 10 opposite from the first side P of the associated vehicle 10. Without in any way limiting the scope, interpretation, or application of the claims appearing below, a desirable technical effect of one or more of the example embodiments disclosed herein is that the ability to decelerate the vehicle using the drive wheel brakes is not adversely affected should one or more of the drive wheel brakes on one side of the vehicle experience slippage, skidding, lockup or the like during deceleration operations because the drive wheel brakes on the other or opposite side of the vehicle likely would not experience such slippage, skidding, lockup or the like and would therefore be able to provide adequate deceleration.

The braking control apparatus 100 is adapted to simultaneously effect, based on received one or more or all of the vehicle braking signals 102, 103, and/or 104 wheel-by-wheel braking control of drive wheel brakes of the plurality of drive axles 40, 42 of the associated vehicle, while also simultaneously effecting based on the received one or more or all of the vehicle braking signals 102, 103, and/or 104 axle-by-axle braking control of steerable wheel brakes of the first and second steerable axles 20, 22 of the associated vehicle 10.

Without in any way limiting the scope, interpretation, or application of the claims appearing below, a further technical effect of simultaneously effecting the axle-by-axle braking control of the steerable wheel brakes and the wheel-by-wheel braking control of the drive wheel brakes is that the ability to decelerate the vehicle using both the steerable and drive wheel brakes while simultaneously needing to steer the vehicle is not adversely affected should one or more of the steerable wheel brakes on any of the steerable axles experience slippage, skidding, lockup or the like during deceleration operations because the steerable wheel brakes on the axle that has brakes that are not slipping would adequately provide the necessary rolling contact with the surface underlying the vehicle to provide the steering capability.

In the exemplary embodiment of FIG. 2, the braking control apparatus 100 may include one or more devices or systems 214 for providing input data indicative of one or more operating parameters or one or more conditions of a commercial vehicle. For example, the devices 214 may be one or more sensors, such as but not limited to, one or more wheel speed sensors 244, a lateral acceleration sensor 227, a steering angle sensor 246, a brake air pressure supply sensor 235, a vehicle load sensor 224, a yaw rate sensor 226, a lane departure warning (LDW) sensor or system 222, and a tire pressure (TPMS) monitoring system 225. The braking control apparatus 100 may also utilize additional devices or sensors in the exemplary embodiment including for example a forward distance sensor 230. In addition, operator interfaces are provided in the form of a human-machine interface (HMI) 275 that includes one or more inputs such as a keyboard and/or a human readable display or the like for presenting visible information to the driver, and a cursor control such as a joystick or mouse or the like. Other sensors and/or actuators or energy generation devices or combinations thereof may be used of otherwise provided as well, and one or more devices or sensors may be combined into a single unit as may be necessary and/or desired.

The vehicle braking control apparatus 100 may also include a logic applying arrangement such as a controller or processor device 122, a non-transient memory device 124 operatively coupled with the processor device 122, and brake control logic 126 stored in the non-transient memory device 124. In an implementation, the brake control logic 126 includes axle-by-axle braking control logic 127 stored in the non-transient memory device 124, wherein the axle-by-axle braking control logic 127 is executable by the processor device 122 to generate the steerable wheel brake control signal 130 for performing the axle-by-axle braking control of the steerable wheel brakes of the first and second steerable axles of the associated vehicle 10. Further in an implementation, the brake control logic 126 includes wheel-by-wheel braking control logic 128 stored in the non-transient memory device 124, wherein the wheel-by-wheel braking control logic 128 is executable by the processor device 122 to generate the drive wheel brake control signal 132 for performing the wheel-by-wheel braking control of the drive wheel brakes of the plurality of drive axles of the associated vehicle 10.

The controller or processor device 122 in accordance with an implementation is in communication with the one or more devices or systems 214. The processor device 122 may include one or more inputs for receiving input data from the devices or systems 214. The processor device 122 may be adapted to process the input data and compare the raw or processed input data to a stored threshold value. The processor device 122 may also include one or more outputs for delivering control signals and steerable and drive wheel brake control signals 130, 132 to one or more vehicle systems based on the comparison. The control signals may instruct the systems to intervene in the operation of the vehicle to initiate corrective action, and then report this corrective action to a wireless service (not shown) or simply store the data locally to be used for determining a driver quality. For example, the processor device 122 may generate and send a control signal to an engine electronic control unit or an actuating device to reduce the engine throttle 237 and slowing the vehicle down. Further, the processor device 122 may send the control signal to a vehicle brake system to selectively engage the brakes. In a tractor-trailer arrangement of a further example embodiment, the processor device 122 may engage the brakes on one or more wheels of a trailer portion of the vehicle 10 via a trailer pressure control device (not shown) and the brakes on one or more wheels of a tractor portion of the vehicle, and then report this corrective action to the wireless service or simply store the data locally to be used for determining a driver quality. A variety of corrective actions may be possible and multiple corrective actions may be initiated at the same time.

The processor device 122 may also utilize one or more portions of the non-transitory memory device 124 for storing and accessing system information, such as for example system control logic, default trailer and other equipment parameter values representative of equipment parameters of a default set of one or more towed vehicles, or the like. The memory portion 124, however, may be separate from the processor device 122. One or more of the sensors 214, the processor device 122, and/or the non-transitory memory device 124 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the processor device 122 of the example embodiment. Therefore, many of the components to support the vehicle braking control apparatus 100 of the present disclosure may be present in a vehicle equipped with the Bendix® ESPR system, thus, not requiring the installation of additional components. The vehicle braking control apparatus 100, however, may utilize independently installed components if desired.

Still yet further, the brake control apparatus 100 may also include a transmitter/receiver (transceiver) module 242 such as, for example, a radio frequency (RF) transmitter including one or more antennas 252 for wireless communication of the automated deceleration requests, GPS data, one or more various vehicle configuration and/or condition data, or the like between the vehicles and one or more destinations such as, for example, to one or more wireless services (not shown) having a corresponding receiver and antenna. The transmitter/receiver (transceiver) module 242 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor device 122 is operative to communicate the acquired data to the one or more receivers in a raw data form, that is without processing the data, in a processed form such as in a compressed form, in an encrypted form or both as may be necessary or desired. In this regard, the processor device 122 may combine selected ones of the vehicle parameter data values into processed data representative of higher level vehicle condition data such as, for example, data from the lateral acceleration sensor 227 may be combined with the data from the steering angle sensor 226 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

In the example embodiment illustrated, the brake control apparatus 100 of respective vehicles of a platoon are configured for mutually communicating signals and exchanging data between each other and between their respective one or more towed vehicles, and also for communicating signals and exchanging data with various other communication systems including for example a remote wireless communication system and a remote satellite system. These remote systems can provide, for example, global position system (GPS) data to the vehicles as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to trailer braking strategies for platooning for inter-vehicle platoon distance and/or spacing management i.e. platoon ordering and spacing beneficially without the need to consult with or act under the direction of or in concert with the remote satellite system, the remote fleet management facility, a Network Operations Center (NOC), a Central Command Center (CCC), or the like.

The trailer brake control apparatus 100 of FIG. 2 is suitable for executing embodiments of one or more software systems or modules that perform trailer brake strategies and trailer braking control methods according to the subject application. The example brake control apparatus 100 may include a bus or other communication mechanism for communicating information, and the processor device 122 may be coupled with the bus for processing information. The non-transitory memory device 124 of the system may be any form of memory device such as for example random access memory (RAM) or other dynamic storage device for storing information and instructions to be executed by the processor device 122, and read only memory (ROM) or other static storage device for storing static information and instructions for the processor device 122. Other storage devices may also suitably be provided for storing information and instructions as necessary or desired.

Logic instructions may be read into the main memory 124 from another computer-readable medium, such as another storage device of via the transceiver 242. Execution of the sequences of instructions contained in main memory 124 causes the processor device 122 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor device 122 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, any other physical medium, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor device, a discrete logic (e.g., ASIC), an analog circuit, a digital circuit, a programmed logic device, a memory device containing instructions, and so on. Logic may include one or more gates, combinations of gates, or other circuit components.

In accordance with an example embodiment, the brake control logic 126 is executable by the processor device 122 to generate steerable and drive wheel brake control signals 130, 132 for effecting the axle-by-axle and the wheel-by-wheel braking control of the steerable wheel brakes and the drive wheel brakes of the associated vehicle 10, respectively, based on the received vehicle braking signal 102, 103, and/or 104 to perform the braking operation in the associated multiple-steer vehicle 10.

In accordance with an example embodiment, the axle-by-axle braking control logic 127 is executable by the processor device 122 to generate the steerable wheel brake control signal 130 for performing the axle-by-axle braking control of the steerable wheel brakes 30, 31, 32, 33 of the first and second steerable axles of the associated vehicle 10.

In accordance with an example embodiment, the wheel-by-wheel braking control logic 128 is executable by the processor device 122 to generate the drive wheel brake control signal 132 for performing the wheel-by-wheel braking control of the drive wheel brakes 50, 51, 52, 53 of the plurality of drive axles of the associated vehicle 10.

In accordance with an example embodiment, the anti-lock braking system (ABS) brake control logic 129 stored in the memory device 124 is executable by the processor device 122 to generate first anti-lock braking system (ABS) signals 133, 134 for effecting ABS braking control over the first brake group 24 of two or more steerable wheel brakes 30, 32 on the first steerable axle of the associated vehicle 10 for effecting ABS braking control over the first brake group 24 of two or more steerable wheel brakes 30, 32 on the first steerable axle 20 of the associated vehicle 10.

In accordance with an example embodiment, the anti-lock braking system (ABS) brake control logic 129 stored in the memory device 124 is executable by the processor device 122 to generate the first anti-lock braking system (ABS) signals 133, 134 for effecting the ABS braking control over the first brake group 24 of two or more steerable wheel brakes 30, 32 on the first steerable axle 20 of the associated vehicle 10, and also to generate second ABS signals 135, 136 for effecting ABS braking control over the second brake group 26 of two or more steerable wheel brakes 31, 33 on the second steerable axle of the associated vehicle 10.

Figure 3:
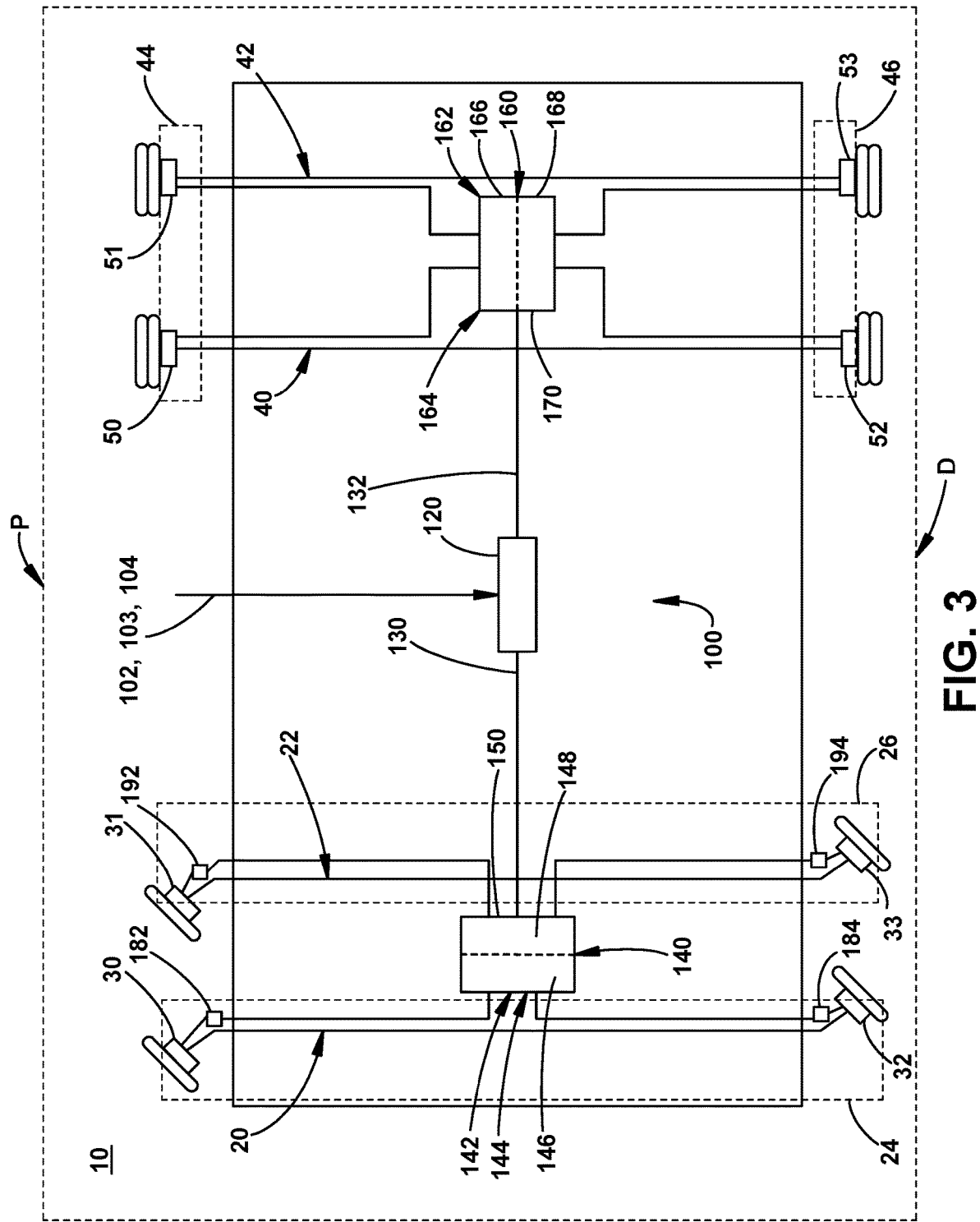
FIG. 3 is a schematic block diagram depiction that illustrates details of the braking control apparatus of FIGS. 1 and 2 disposed in a representative associated multiple-steer vehicle in accordance with an example embodiment.

FIG. 3 is a schematic block diagram depiction that illustrates details of the braking control apparatus 100 of FIGS. 1 and 2 disposed in a representative associated multiple-steer vehicle 10 in accordance with an example embodiment. With reference now to that Figure, the braking control apparatus 100 includes an electronic control unit (ECU) 120, a first electro-pneumatic module (EPM) 140 operatively coupled with the ECU 120, and a second EPM 160 operatively coupled with the ECU 120. The ECU 120 is configured to receive a vehicle braking signal 102, 103, 104 to effect a braking operation in the associated vehicle 10. In the implementation, the ECU 120 includes a processor device 122, a non-transitory memory device 124 operatively coupled with the processor device 122, and brake control logic 126 stored in the memory device 124. The brake control logic 126 is executable by the processor device 122 to generate steerable and drive wheel brake control signals 130, 132 to perform the braking operation in the associated multiple-steer vehicle 10 based on the received vehicle braking signal 102, 103, 104.

In accordance with the example implementation illustrated, the first EPM 140 is responsive to the steerable wheel brake control signal 130 received from the ECU 120 to effect axle-by-axle braking control of steerable wheel brakes 30, 31, 32, 33 of the first and second steerable axles 20, 22 of the associated vehicle 10.

Similarly and in accordance with the example implementation illustrated, the second EPM 160 is responsive to the drive wheel brake control signal 132 received from the ECU 120 to effect wheel-by-wheel braking control of drive wheel brakes 50, 51, 52, 53 of the plurality of drive axles 40, 42 of the associated vehicle 10.

In particular in the example, the first EPM 140 is responsive to the steerable wheel brake control signal 130 received from the ECU 120 to effect axle-by-axle braking control of the steerable wheel brakes 30, 31, 32, 33 of the first and second steerable axles 20, 22 of the associated vehicle 10 by selectively delivering pressurized air to a first brake group 24 of two or more steerable wheel brakes 30, 32 on the first steerable axle 20 of the associated vehicle 10, and by selectively delivering the pressurized air to a second brake group 26 of two or more steerable wheel brakes 31, 33 on the second steerable axle 32 of the associated vehicle 10, wherein and as shown in FIG. 1 is different from the first steerable axle 20 of the associated vehicle 10.

Further and in particular in the example, the second EPM 160 is responsive to the drive wheel brake control signal 132 received from the ECU 120 to effect wheel-by-wheel braking control of the drive wheel brakes 50, 51, 52, 53 by selectively delivering pressurized air to a third brake group 44 of two or more drive wheel brakes 50, 51 on the first side P of the associated vehicle 10, and by selectively delivering the pressurized air to a fourth brake group 46 of two or more drive wheel brakes 52, 53 on the second side D of the associated vehicle 10, wherein and as shown in FIG. 1 is opposite from the first side P of the associated vehicle 10.

In accordance with the example implementation illustrated, the processor device 122 (FIG. 2) executes the brake control logic 126 to generate the steerable and drive wheel brake control signals 130, 132 for effecting the axle-by-axle and the wheel-by-wheel braking control of the steerable wheel brakes 30, 31, 32, 33 and the drive wheel brakes 50, 51, 52, 53 of the associated vehicle 10, respectively, based on the received vehicle one or more braking signal(s) 102, 103, 104 to perform the braking operation in the associated multiple-steer vehicle 10.

In accordance with an example implementation, the first EPM 140 is responsive to the steerable wheel brake control signal 130 received from the ECU 120 to effect the axle-by-axle braking control of steerable wheel brakes 30, 31, 32, 33 of the first and second steerable axles 20, 22 by selectively delivering the pressurized air to the first brake group 24 of two or more steerable wheel brakes 30, 32 separately from selectively delivering the pressurized air to the second brake group 26 of two or more steerable wheel brakes 31, 33.

In accordance with a further example implementation, the first EPM 140 is responsive to the steerable wheel brake control signal 130 received from the ECU 120 to effect the axle-by-axle braking control of steerable wheel brakes 30, 31, 32, 33 of the first and second steerable axles 20, 22 by simultaneously selectively delivering the pressurized air to the first brake group 24 of two or more steerable wheel brakes 30, 32 separately from selectively delivering the pressurized air to the second brake group 26 of two or more steerable wheel brakes 31, 33.

In this way and without in any way limiting the scope, interpretation, or application of the claims appearing below, a technical effect of simultaneously effecting the wheel-by-wheel braking control of the drive wheel brakes and the axle-by-axle braking control of the steerable wheel brakes is that the ability to decelerate the vehicle using both the steerable and drive wheel brakes while simultaneously needing to steer the vehicle is not adversely affected should one or more of the steerable wheel brakes on any of the steerable axles experience slippage, skidding, lockup or the like during deceleration operations because the steerable wheel brakes on the axle that has brakes that are not slipping would adequately provide the necessary rolling contact with the surface underlying the vehicle to provide the steering capability.

In accordance with an example implementation, the brake control logic 126 stored in the non-transitory memory device 124 may comprise and axle-by-axle braking control logic 127, and wheel-by-wheel braking control logic 128. In this particular example implementation, the axle-by-axle braking control logic 127 is executable by the processor device 122 to generate the steerable wheel brake control signal 130 for performing the axle-by-axle braking control of the steerable wheel brakes 30, 31, 32, 33 of the first and second steerable axles 20, 22 of the associated vehicle 10. In addition and in this particular implementation, the wheel-by-wheel braking control logic 128 is executable by the processor device 122 to generate the drive wheel brake control signal 132 for performing the wheel-by-wheel braking control of the drive wheel brakes 50, 51, 52, 53 of the plurality of drive axles 40, 42 of the associated vehicle 10.

In accordance with the example implementation illustrated, the first EPM 140 of the braking control apparatus 100 is a first multi-channel EPM 142, and the second EPM 160 is a second multi-channel EPM 162.

Further in accordance with the example implementation illustrated, the first multi-channel EPM 142 of the braking control apparatus 100 is a first 2-channel EPM 144, and the second multi-channel EPM 162 is a second 2-channel EPM 164.

Still further in accordance with the example implementation illustrated, a first channel 146 of the first 2-channel EPM 144 is configured to control the first brake group 24 of two or more steerable wheel brakes 30, 32 on the first steerable axle 40 of the associated vehicle 10 in mutual coordination in response to the steerable wheel brake control signal 130 received from the ECU 120, and a second channel 148 of the first 2-channel EPM 144 is configured to control the second brake group 26 of two or more steerable wheel brakes 31, 33 on the second steerable axle 42 of the associated vehicle 10 in mutual coordination in response to the steerable wheel brake control signal 130 received from the ECU.

Yet still further in accordance with the example implementation illustrated, a first channel 166 of the second 2-channel EPM 164 is configured to control the third brake group 44 of two or more drive wheel brakes 50, 51 on the first side P of the associated vehicle 10 in mutual coordination in response to the drive wheel brake control signal 132 received from the ECU 120, and a second channel 168 of the second 2-channel EPM 164 is configured to control the fourth brake group 46 of two or more drive wheel brakes 52, 53 on the second side D of the associated vehicle 10 in mutual coordination in response to the drive wheel brake control signal 132 received from the ECU 120.

Figure 4:
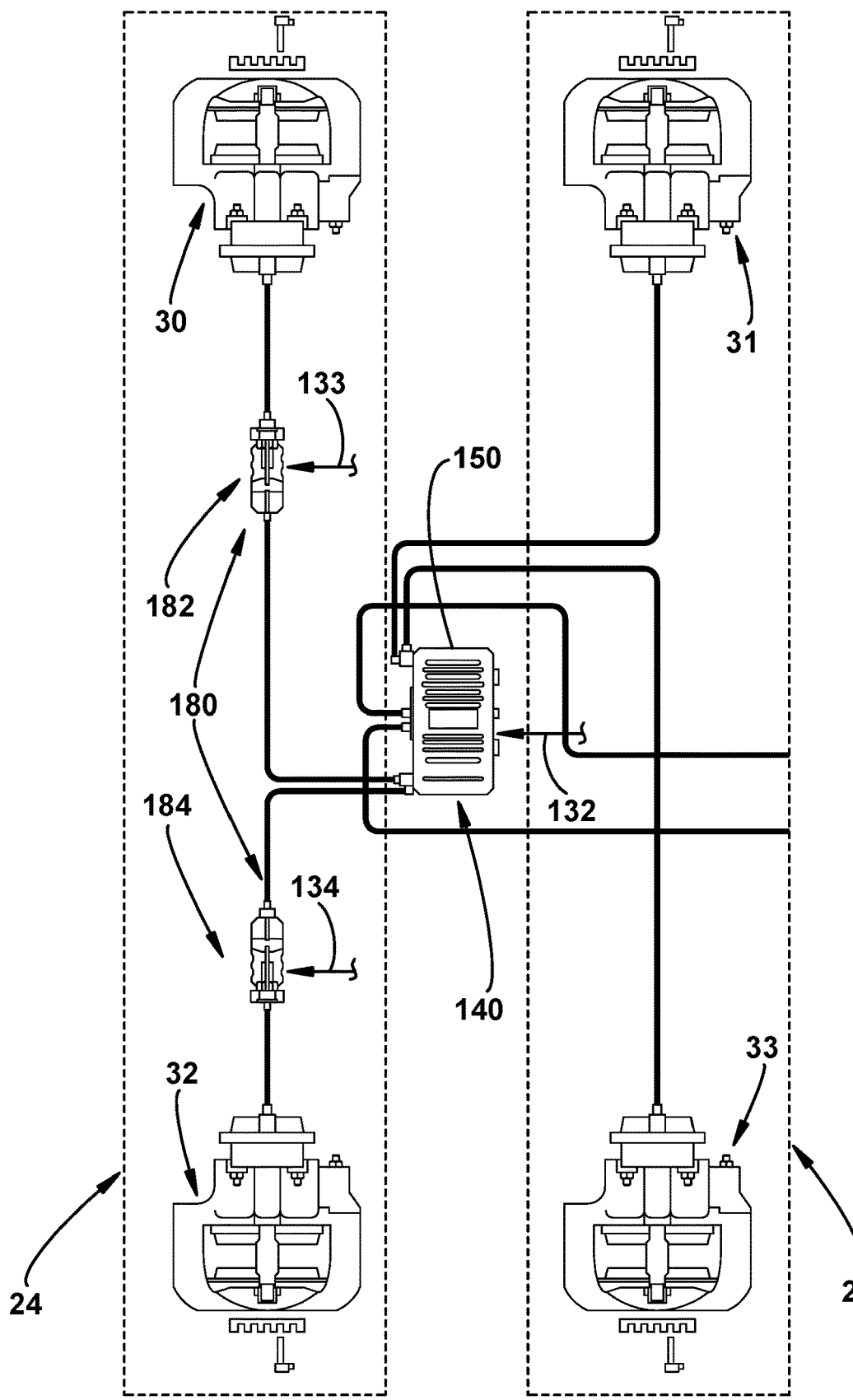
FIG. 4 is a schematic block diagram depiction that illustrates details of an anti-lock brake system (ABS) portion the braking control apparatus of FIGS. 1-3 in accordance with an example embodiment.

FIG. 4 is a schematic block diagram depiction that illustrates details of an automated anti-lock brake system (ABS) portion the braking control apparatus 100 of FIGS. 1-3 in accordance with an example embodiment. As shown there, the braking control apparatus 100 in accordance with an implementation includes a first set 180 of two or more PCVs 182, 184. The first set of PCVs collectively provide ABS capability to the associated vehicle 10.

In an example implementation, anti-lock braking system (ABS) brake control logic 129 is stored in the non-transient memory device 124 of the braking control apparatus 100. The ABS brake control logic 129 stored in the memory device 124 is executable by the processor device 122 to generate first ABS signals 133, 134 for effecting ABS braking control over the first brake group 24 of two or more steerable wheel brakes 30, 32 on the first steerable axle 20 (FIG. 1) of the associated vehicle 10.

In the implementation shown, the first set 180 of two or more PCVs 182, 184 is in pneumatic communication with the first EPM 140. The first set 180 of two or more PCVs 182, 184 is responsive to first ABS signals 133, 134 received from the ECU 120 to selectively interrupt delivery of the pressurized air from the first EPM 140 to the first brake group 24 of two or more steerable wheel brakes 30, 32 on the first steerable axle 20 of the associated vehicle 10.

Figure 4A:
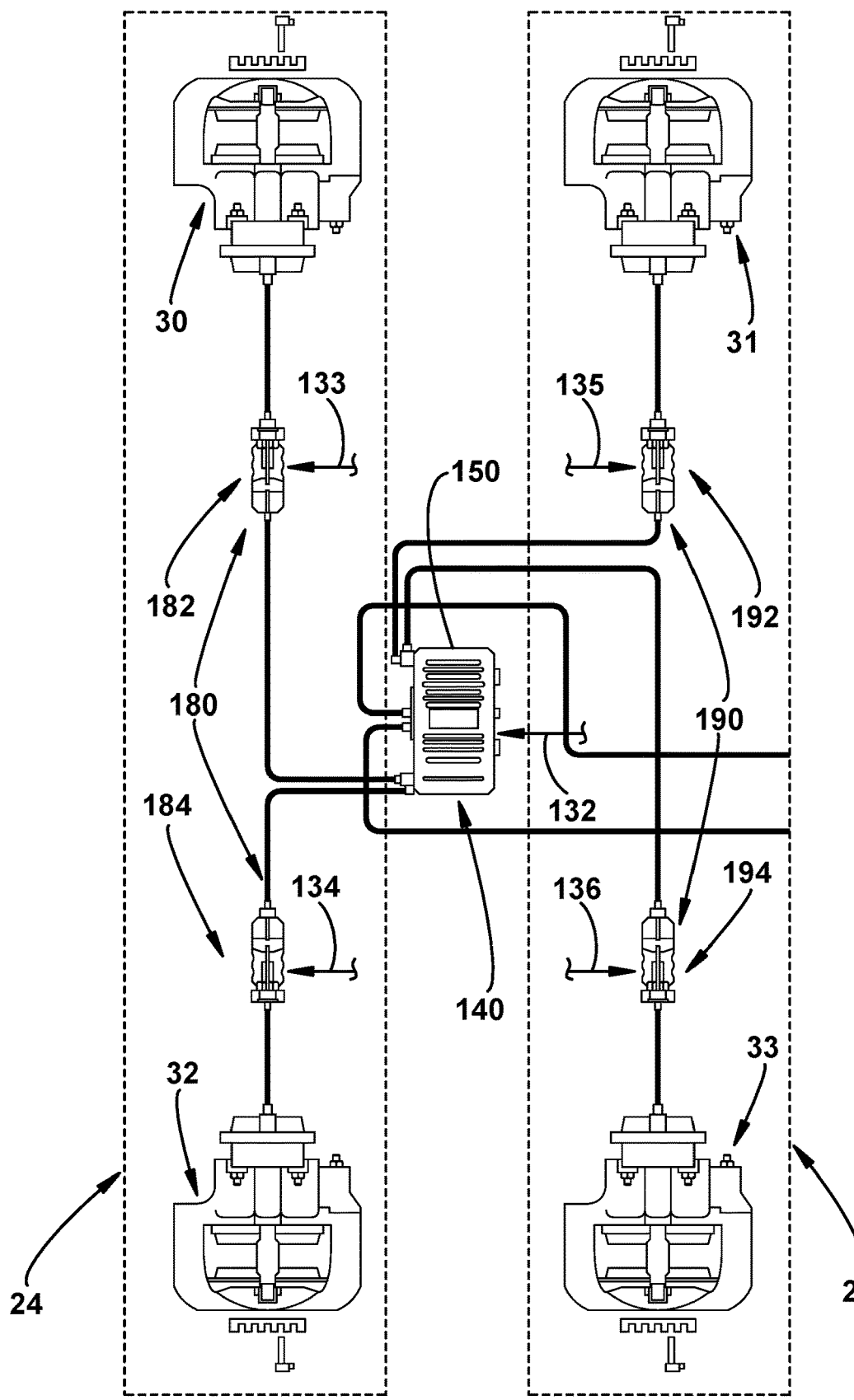
FIG. 4A is a schematic block diagram depiction that illustrates details of an anti-lock brake system (ABS) portion the braking control apparatus of FIGS. 1-3 in accordance with an example embodiment.

FIG. 4A is a schematic block diagram depiction that illustrates details of an automated anti-lock brake system (ABS) portion the braking control apparatus 100 of FIGS. 1-3 in accordance with an example embodiment. As shown there, the braking control apparatus 100 in accordance with an implementation includes a first set 180 of two or more PCVs 182, 184, and a second set 190 of two or more PCVs 192, 194. The first and second sets of PCVs collectively provide ABS capability to the associated vehicle 10.

In an example implementation, anti-lock braking system (ABS) brake control logic 129 is stored in the non-transient memory device 124 of the braking control apparatus 100. The ABS brake control logic 129 stored in the memory device 124 is executable by the processor device 122 to generate first ABS signals 133, 134 for effecting ABS braking control over the first brake group 24 of two or more steerable wheel brakes 30, 32 on the first steerable axle 20 (FIG. 1) of the associated vehicle 10. The ABS brake control logic 129 is further executable by the processor device 122 to generate second ABS signals 135, 136 for effecting ABS braking control over the second brake group 26 of two or more steerable wheel brakes 31, 33 on the second steerable axle 22 (FIG. 1) of the associated vehicle 10.

In the implementation shown, the first set 180 of two or more PCVs 182, 184 is in pneumatic communication with the first EPM 140. The first set 180 of two or more PCVs 182, 184 is responsive to first ABS signals 133, 134 received from the ECU 120 to selectively interrupt delivery of the pressurized air from the first EPM 140 to the first brake group 24 of two or more steerable wheel brakes 30, 32 on the first steerable axle 20 of the associated vehicle 10.

In the implementation shown, the second set 190 of two or more PCVs 192, 194 is in pneumatic communication with the first EPM 140. The second set 190 of two or more PCVs 192, 194 is responsive to second ABS signals 135, 136 received from the ECU 120 to selectively interrupt delivery of the pressurized air from the first EPM 140 to the second brake group 26 of two or more steerable wheel brakes 31, 33 on the second steerable axle 22 of the associated vehicle 10.

Figure 5:
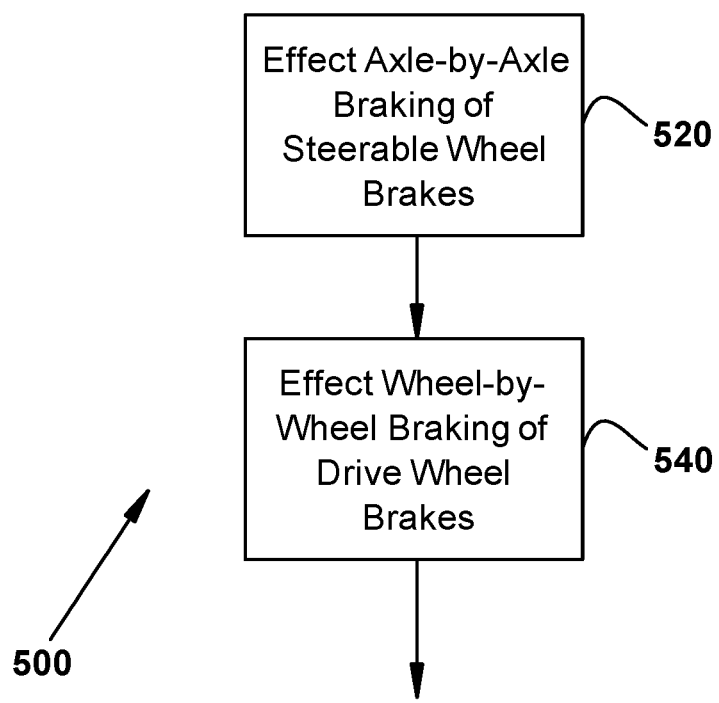
FIG. 5 is a flow diagram showing a braking control method for performing a braking operation in an associated multiple-steer vehicle having a plurality of drive axles and first and second steerable axles in accordance with an example embodiment.

FIG. 5 is a flow diagram showing a braking control method 500 for performing a braking operation in an associated multiple-steer vehicle 10 having first and second steerable axles 20, 22 and a plurality of drive axles 40, 42 and in accordance with an example embodiment. With reference now to that Figure, axle-by-axle braking control of steerable wheel brakes 30, 31, 32, 33 of the first and second steerable axles 20, 22 of the associated vehicle 10 is effected at 520. In addition, wheel-by-wheel braking control of drive wheel brakes 50, 51, 52, 53 of the plurality of drive axles 40, 42 of the associated vehicle 10 is effected at 540.

In accordance with an implementation herein, the axle-by-axle braking control of steerable wheel brakes 30, 31, 32, 33 of the steerable axles 20, 22 of the associated vehicle 10 is effected at 520 by selectively delivering pressurized air to the first brake group 24 of two or more steerable wheel brakes 30, 31 on the first axle 20 of the associated vehicle 10, and selectively delivering the pressurized air to the second brake group 26 of two or more steerable wheel brakes 32, 33 on the second axle 22 of the associated vehicle 10 different from the first steerable axle 20 of the associated vehicle 10.

Further in accordance with an implementation herein, the wheel-by-wheel braking control of drive wheel brakes 50, 51, 52, 53 of the first and second drive axles 40, 42 of the associated vehicle 10 is effected at 540 by selectively delivering the pressurized air to the third brake group 44 of two or more drive wheel brakes 50, 51 on the first side P of the associated vehicle 10, and selectively delivering the pressurized air to the fourth brake group 46 of two or more drive wheel brakes 52, 53 on the second side D of the associated vehicle 10 opposite from the first side P of the associated vehicle 10.

In accordance with an implementation herein, the effecting axle-by-axle braking control 520) of steerable wheel brakes 30, 31, 32, 33 of the first and second steerable axles 20, 22 may comprise selectively delivering the pressurized air to the first brake group 24 of two or more steerable wheel brakes 30, 32 separately from selectively delivering the pressurized air to the second brake group 26 of two or more steerable wheel brakes 31, 33.

In accordance with a further implementation herein, the effecting axle-by-axle braking control 520 of steerable wheel brakes 30, 31, 32, 33 of the first and second steerable axles 20, 22 may comprise simultaneously selectively delivering the pressurized air to the first brake group 24 of two or more steerable wheel brakes 30, 32 separately from selectively delivering the pressurized air to the second brake group 26 of two or more steerable wheel brakes 31, 33.

Figure 6:
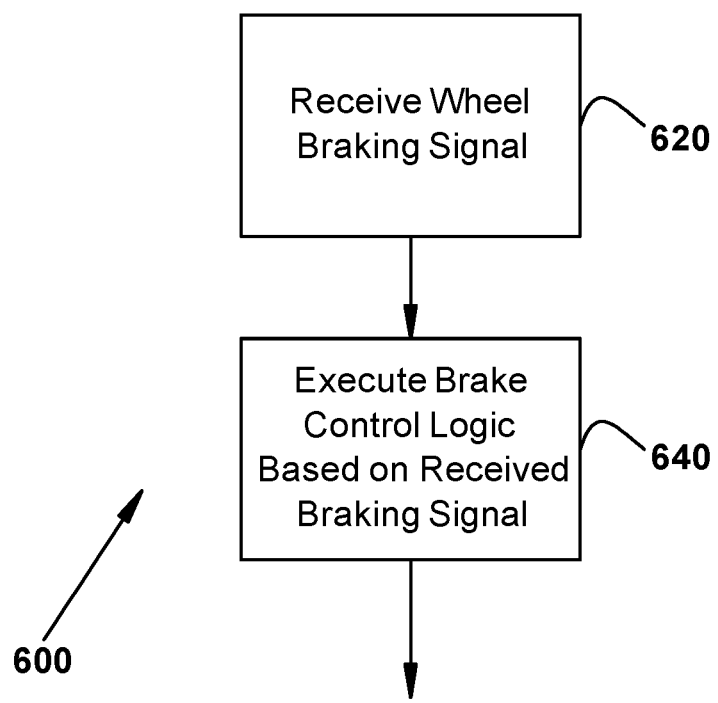
FIG. 6 is a flow diagram showing a braking control method that includes the method of FIG. 5 and for performing a braking operation in an associated multiple-steer vehicle having a plurality of drive axles and first and second steerable axles in accordance with an example embodiment.

FIG. 6 is a flow diagram showing a braking control method 600 that includes the method of FIG. 5 and for performing a braking operation in an associated multiple-steer vehicle having a plurality of drive axles and first and second steerable axles in accordance with an example embodiment. With reference now to that Figure, the method 600 includes receiving 620 a vehicle braking signal 102, 103, 104 by an electronic control unit (ECU) 120 comprising a processor device 122, a non-transitory memory device 124 operatively coupled with the processor device 122, and brake control logic 126 stored in the memory device 124. In the implementation, the received vehicle braking signal 102, 103, 104 is representative of the braking operation to be performed by the associated vehicle 10.

Further, the brake control logic 126 is executed at 640 by the processor device 122 to perform the braking operation in the associated multiple-steer vehicle 10 based on the received vehicle braking signal 102, 103, 104.

Figure 7:
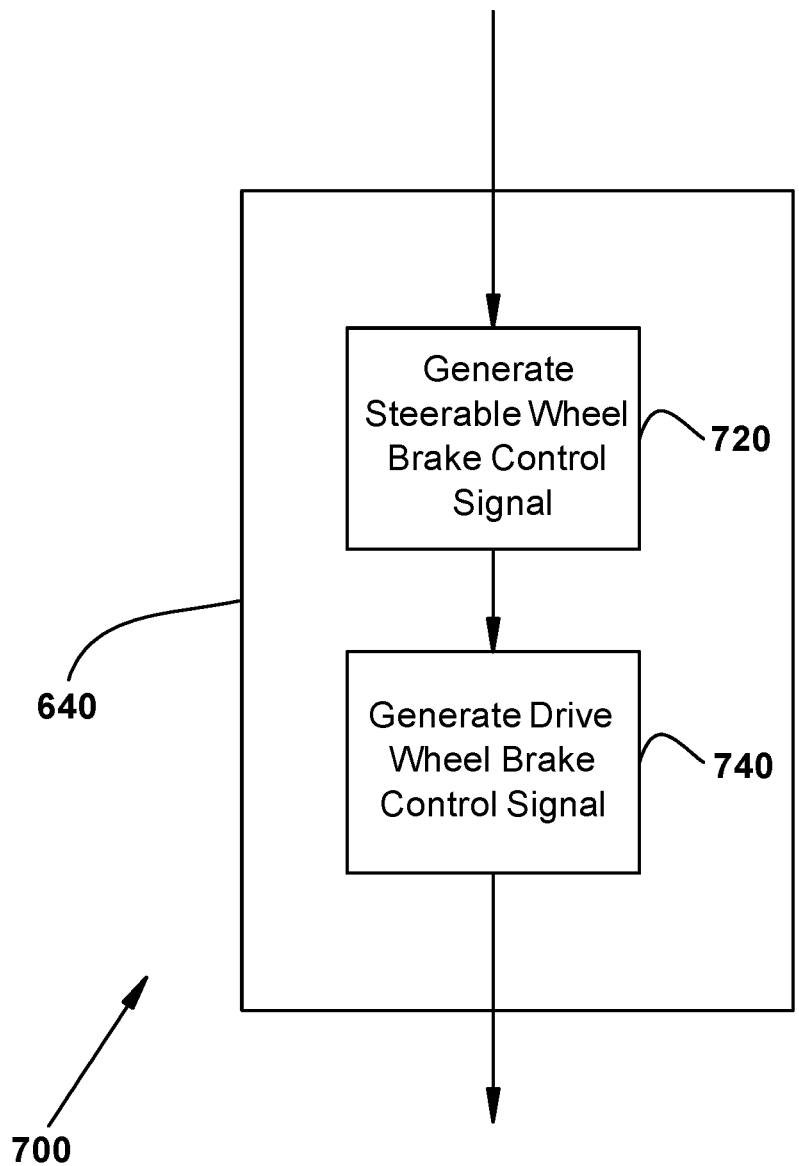
FIG. 7 is a flow diagram showing a braking control method that implements the execution of the brake control logic of FIG. 6 in accordance with an example implementation herein.

FIG. 7 is a flow diagram showing a braking control method 700 that implements the execution of the brake control logic 126 at 640 of FIG. 6 in accordance with an example implementation herein. With reference now to that Figure, the method 700 executes 640 the brake control logic 126 by the processor device 122 to perform the braking operation in the associated multiple-steer vehicle 10 based on the received vehicle braking signal 102, 103, 104 by generating 720 a steerable wheel brake control signal 130 to effect the axle-by-axle braking control 520 of the steerable wheel brakes 30, 31, 32, 33 of the first and second steerable axles 20, 22 of the associated vehicle 10, and generating 740 a drive wheel brake control signal 132 to effect the wheel-by-wheel braking control 540 of the drive wheel brakes 50, 51, 52, 53 of the plurality of drive axles 40, 42 of the associated vehicle 10.

In accordance with an implementation herein, the effecting the axle-by-axle control 520 of the steerable wheel brakes 30, 31, 32, 33 may include effecting the axle-by-axle control 520 of the steerable wheel brakes 30, 31, 32, 33 by a first EPM 140 operable in response to the steerable wheel brake control signal 130, and the effecting the wheel-by-wheel braking control 540 of the drive wheel brakes 50, 51, 52, 53 may include effecting the wheel-by-wheel braking control 540 of the drive wheel brakes 50, 51, 52, 53 by a second EPM 160 operable in responsive to the drive wheel brake control signal 132.

In accordance with an implementation herein, the effecting the axle-by-axle control 520 of the steerable wheel brakes 30, 31, 32, 33 may include effecting the axle-by-axle control 520 of the steerable wheel brakes 30, 31, 32, 33 by a first multi-channel EPM 142 operable in response to the steerable wheel brake control signal 130, and the effecting the wheel-by-wheel braking control 540 of the drive wheel brakes 50, 51, 52, 53 may include effecting the wheel-by-wheel braking control 540 of the drive wheel brakes 50, 51, 52, 53 by a second multi-channel EPM 162 operable in responsive to the drive wheel brake control signal 132.

In accordance with an implementation herein, the effecting the axle-by-axle control 520 of the steerable wheel brakes 30, 31, 32, 33 may include effecting the axle-by-axle control 520 of the steerable wheel brakes 30, 31, 32, 33 by a first 2-channel EPM 144 operable in response to the steerable wheel brake control signal 130, and the effecting the wheel-by-wheel braking control 540 of the drive wheel brakes 50, 51, 52, 53 may include effecting the wheel-by-wheel braking control 540 of the drive wheel brakes 50, 51, 52, 53 by a second 2-channel EPM 164 operable in responsive to the drive wheel brake control signal 132.

In accordance with an implementation herein, the effecting the axle-by-axle control 520 of the steerable wheel brakes 30, 31, 32, 33 may include controlling using a first channel 146 of the first 2-channel EPM 144 the second brake group 24 of two or more steerable wheel brakes 30, 32 on the first steerable axle 20 of the associated vehicle 10 in mutual coordination, and controlling using second channel 148 of the first 2-channel EPM 144 the second brake group 26 of two or more steerable wheel brakes 31, 33 on the second steerable axle 22 of the associated vehicle 10 in mutual coordination. Further in accordance with the implementation herein, the effecting the wheel-by-wheel braking control 540 of the drive wheel brakes 50, 51, 52, 53 may include controlling using a first channel 166 of the second 2-channel EPM 164 the third brake group 44 of two or more drive wheel brakes 50, 51 on the first side P of the associated vehicle 10 in mutual coordination, and controlling using a second channel 168 of the second 2-channel EPM 164 the fourth brake group 46 of two or more drive wheel brakes 52, 53 on the second side D of the associated vehicle 10 in mutual coordination.

Figure 8:
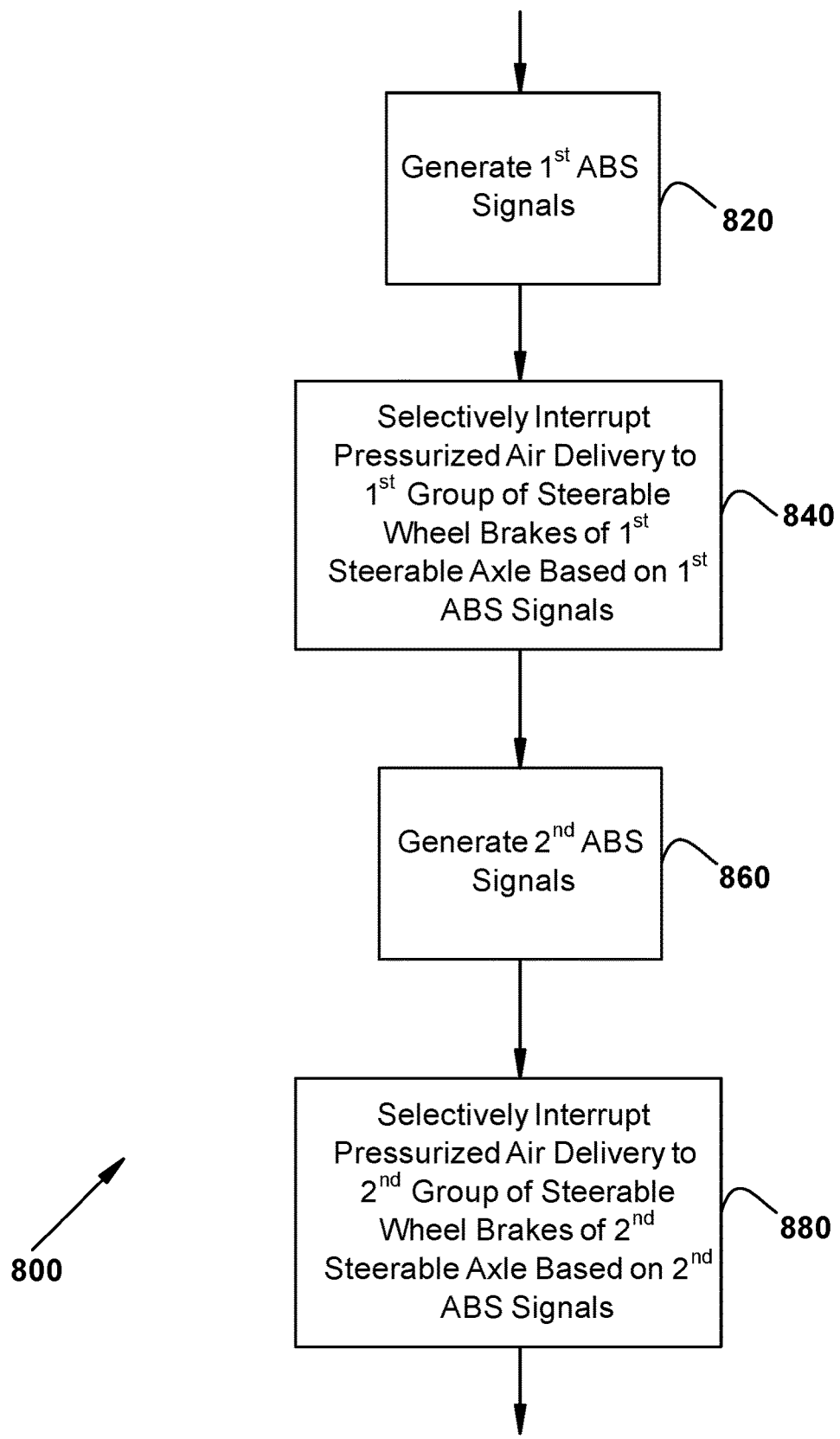
FIG. 8 is a flow diagram showing a braking control method that implements automated braking control in accordance with an example implementation herein.

FIG. 8 is a flow diagram showing a braking control method 800 that implements automated braking control in accordance with an example implementation herein. In accordance with the example implementation illustrated, the braking control method 800 includes executing by the processor device 122 anti-lock braking system (ABS) brake control logic 129 stored in the memory device 124 to generate 820 first anti-lock braking system (ABS) signals 133, 134 for effecting ABS braking control over the first brake group 24 of two or more steerable wheel brakes 30, 32 on the first steerable axle 20 of the associated vehicle 10.

In addition, the braking control method 800 that implements automated braking control further includes selectively interrupting 840 based on the first anti-lock braking system (ABS) signals 133, 134 delivery of the pressurized air from the first EPM 140 to the first brake group 24 of two or more steerable wheel brakes 30, 32 on the first steerable axle 20 of the associated vehicle 10 using a first set 180 of two or more pressure control valves (PCVs) 180, 182 in pneumatic communication with the first EPM 140.

The braking control method 800 further includes executing by the processor device 122 anti-lock braking system (ABS) brake control logic 129 stored in the memory device 124 to generate 860 second ABS signals 135, 136 for effecting ABS braking control over the second brake group 26 of two or more steerable wheel brakes 31, 33 on the second steerable axle 22 of the associated vehicle 10.

In further addition, the braking control method 800 that implements automated braking control also includes selectively interrupting 880 based on the second ABS signals 135, 136 delivery of the pressurized air from the first EPM 140 to the second brake group 26 of two or more steerable wheel brakes 31, 33 on the second steerable axle 22 of the associated vehicle 10 using a second set 190 of two or more PCVs 190, 192 in pneumatic communication with the first EPM 140.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A braking control apparatus for use in an associated multiple-steer vehicle having first and second steerable axles, and a plurality of drive axles, the braking control apparatus comprising:
an electronic control unit (ECU) configured to receive a vehicle braking signal to effect a braking operation in the associated vehicle, the ECU comprising:
a processor device;
a non-transitory memory device operatively coupled with the processor device; and
brake control logic stored in the memory device, the brake control logic being executable by the processor device to generate steerable and drive wheel brake control signals to perform the braking operation in the associated multiple-steer vehicle based on the received vehicle braking signal;
a first electro-pneumatic module (EPM) operatively coupled with the ECU, the first EPM being responsive to the steerable wheel brake control signal received from the ECU to effect axle-by-axle braking control of steerable wheel brakes of the first and second steerable axles of the associated vehicle by:
selectively delivering pressurized air to a first brake group of two or more steerable wheel brakes on the first steerable axle of the associated vehicle; and
selectively delivering the pressurized air to a second brake group of two or more steerable wheel brakes on the second steerable axle of the associated vehicle different from the first steerable axle of the associated vehicle; and
a second EPM operatively coupled with the ECU, the second EPM being responsive to the drive wheel brake control signal received from the ECU to effect wheel-by-wheel braking control of drive wheel brakes of the plurality of drive axles of the associated vehicle by:
selectively delivering pressurized air to a third brake group of two or more drive wheel brakes on a first side of the associated vehicle; and
selectively delivering the pressurized air to a fourth brake group of two or more drive wheel brakes on a second side of the associated vehicle opposite from the first side of the associated vehicle,
wherein the processor device executes the brake control logic to generate the steerable and drive wheel brake control signals for effecting the axle-by-axle and the wheel-by-wheel braking control of the steerable wheel brakes and the drive wheel brakes of the associated vehicle, respectively, based on the received vehicle braking signal to perform the braking operation in the associated multiple-steer vehicle.

2. The braking control apparatus according to claim 1, wherein:
the first EPM comprises a first multi-channel EPM; and
the second EPM comprises a second multi-channel EPM.

3. The braking control apparatus according to claim 2, wherein:
the first multi-channel EPM comprises a first 2-channel EPM; and
the second multi-channel EPM comprises a second 2-channel EPM.

4. The braking control apparatus according to claim 3, wherein:
a first channel of the first 2-channel EPM is configured to control the first brake group of two or more steerable wheel brakes on the first steerable axle of the associated vehicle in mutual coordination in response to the steerable wheel brake control signal received from the ECU;
a second channel of the first 2-channel EPM is configured to control the second brake group of two or more steerable wheel brakes on the second steerable axle of the associated vehicle in mutual coordination in response to the steerable wheel brake control signal received from the ECU;
a first channel of the second 2-channel EPM is configured to control the third brake group of two or more drive wheel brakes on the first side of the associated vehicle in mutual coordination in response to the drive wheel brake control signal received from the ECU; and
a second channel of the second 2-channel EPM is configured to control the fourth brake group of two or more drive wheel brakes on the second side of the associated vehicle in mutual coordination in response to the drive wheel brake control signal received from the ECU.

5. The braking control apparatus according to claim 1, wherein:
the first EPM comprises a first 2-channel EPM) disposed in a single housing; and
the second EPM comprises a second 2-channel EPM disposed in a single housing.

6. The braking control apparatus according to claim 1, further comprising:

a first set of two or more pressure control valves (PCVs) in pneumatic communication with the first EPM, the first set of two or more PCVs being responsive to first anti-lock braking system (ABS) signals received from the ECU to selectively interrupt delivery of the pressurized air from the first EPM to the first brake group of two or more steerable wheel brakes on the first steerable axle of the associated vehicle.

7. The braking control apparatus according to claim 6, further comprising:
a second set of two or more PCVs in pneumatic communication with the first EPM, the second set of two or more PCVs being responsive to second ABS signals received from the ECU to selectively interrupt delivery of the pressurized air from the first EPM to the second brake group of two or more steerable wheel brakes on the second steerable axle of the associated vehicle.

8. The braking control apparatus according to claim 1, wherein:
the first EPM is responsive to the steerable wheel brake control signal received from the ECU to effect axle-by-axle braking control of the steerable wheel brakes of the first and second steerable axles of the associated vehicle by:
selectively delivering the pressurized air to the first brake group of two or more steerable wheel brakes separately from selectively delivering the pressurized air to the second brake group of two or more steerable wheel brakes for effecting the axle-by-axle braking control of the steerable wheel brakes of the first steerable axle of the associated vehicle separately from effecting the axle-by-axle braking control of the steerable wheel brakes of the second steerable axle of the associated vehicle.

9. The braking control apparatus according to claim 1, wherein:
the first EPM is responsive to the steerable wheel brake control signal received from the ECU to effect axle-by-axle braking control of the steerable wheel brakes of the first and second steerable axles of the associated vehicle by:
simultaneously selectively delivering the pressurized air to the first brake group of two or more steerable wheel brakes separately from selectively delivering the pressurized air to the second brake group of two or more steerable wheel brakes for simultaneously effecting the axle-by-axle braking control of the steerable wheel brakes of the first steerable axle of the associated vehicle separately from effecting the axle-by-axle braking control of the steerable wheel brakes of the second steerable axle of the associated vehicle.

10. The braking control apparatus according to claim 1, wherein:
the brake control logic stored in the memory device comprises:
axle-by-axle braking control logic executable by the processor device to generate the steerable wheel brake control signal for performing the axle-by-axle braking control of the steerable wheel brakes of the first and second steerable axles of the associated vehicle; and
wheel-by-wheel braking control logic executable by the processor device to generate the drive wheel brake control signal for performing the wheel-by-wheel braking control of the drive wheel brakes of the plurality of drive axles of the associated vehicle.

11. The braking control apparatus according to claim 1, further comprising:
anti-lock braking system (ABS) brake control logic stored in the memory device and executable by the processor device to generate:
first anti-lock braking system (ABS) signals for effecting ABS braking control over the first brake group of two or more steerable wheel brakes on the first steerable axle of the associated vehicle; and
a first set of two or more pressure control valves (PCVs) in pneumatic communication with the first EPM, the first set of two or more PCVs being responsive to the first ABS signals received from the ECU to selectively interrupt delivery of the pressurized air from the first EPM to the first brake group of two or more steerable wheel brakes on the first steerable axle of the associated vehicle.

12. The braking control apparatus according to claim 11:
wherein the ABS brake control logic is executable by the processor device to generate:
second ABS signals for effecting ABS braking control over the second brake group of two or more steerable wheel brakes on the second steerable axle of the associated vehicle; and
further comprising a second set of two or more PCVs in pneumatic communication with the first EPM, the second set of two or more PCVs being responsive to the second ABS signals received from the ECU to selectively interrupt delivery of the pressurized air from the first EPM to the second brake group of two or more steerable wheel brakes on the second steerable axle of the associated vehicle.

13. A braking control method for performing a braking operation in an associated multiple-steer vehicle having first and second steerable axles and a plurality of drive axles, the braking control method comprising:
effecting axle-by-axle braking control of steerable wheel brakes of the first and second steerable axles of the associated vehicle by:
selectively delivering the pressurized air to a first brake group of two or more steerable wheel brakes on the first steerable axle of the associated vehicle; and
selectively delivering the pressurized air to a second brake group of two or more steerable wheel brakes on the second steerable axle of the associated vehicle different from the first steerable axle of the associated vehicle; and
effecting wheel-by-wheel braking control of drive wheel brakes of the plurality of drive axles of the associated vehicle by:
selectively delivering pressurized air to a third brake group of two or more drive wheel brakes on a first side of the associated vehicle; and
selectively delivering the pressurized air to a fourth brake group of two or more drive wheel brakes on a second side of the associated vehicle opposite from the first side P of the associated vehicle.

14. The braking control method according to claim 13, further comprising:
receiving a vehicle braking signal by an electronic control unit (ECU) comprising a processor device, a non-transitory memory device operatively coupled with the processor device, and brake control logic stored in the memory device, the received vehicle braking signal being representative of the braking operation to be performed by the associated vehicle; and executing the brake control logic by the processor device to perform the braking operation in the associated multiple-steer vehicle based on the received vehicle braking signal by:
  generating a steerable wheel brake control signal to effect the axle-by-axle braking control of the steerable wheel brakes of the first and second steerable axles of the associated vehicle; and
  generating a drive wheel brake control signal to effect the wheel-by-wheel braking control of the drive wheel brakes of the plurality of drive axles of the associated vehicle,
  wherein the effecting the axle-by-axle control of the steerable wheel brakes comprises effecting the axle-by-axle control of the steerable wheel brakes by a first EPM operable in response to the steerable wheel brake control signal,
  wherein the effecting the wheel-by-wheel braking control of the drive wheel brakes) comprises effecting the wheel-by-wheel braking control of the drive wheel brakes by a second EPM operable in responsive to the drive wheel brake control signal.

15. The braking control method according to claim 14, wherein:
  the effecting the axle-by-axle control of the steerable wheel brakes comprises effecting the axle-by-axle control of the steerable wheel brakes by a first multi-channel EPM operable in response to the steerable wheel brake control signal; and
  the effecting the wheel-by-wheel braking control of the drive wheel brakes comprises effecting the wheel-by-wheel braking control of the drive wheel brakes by a second multi-channel EPM operable in responsive to the drive wheel brake control signal.

16. The braking control method according to claim 15, wherein:
  the effecting the axle-by-axle control of the steerable wheel brakes comprises effecting the axle-by-axle control of the steerable wheel brakes by a first 2-channel EPM operable in response to the steerable wheel brake control signal; and
  the effecting the wheel-by-wheel braking control of the drive wheel brakes comprises effecting the wheel-by-wheel braking control of the drive wheel brakes by a second 2-channel EPM operable in responsive to the drive wheel brake control signal.

17. The braking control method according to claim 16, wherein:
  the effecting the axle-by-axle control of the steerable wheel brakes comprises:
    controlling using a first channel of the first 2-channel EPM the first brake group of two or more steerable wheel brakes on the first steerable axle of the associated vehicle in mutual coordination; and
    controlling using second channel of the first 2-channel EPM the second brake group of two or more steerable wheel brakes on the second steerable axle of the associated vehicle in mutual coordination; and
  the effecting the wheel-by-wheel braking control of the drive wheel brakes comprises:
    controlling using a first channel of the second 2-channel EPM the third brake group of two or more drive wheel brakes on the first side of the associated vehicle in mutual coordination; and
    controlling using a second channel of the second 2-channel EPM the fourth brake group of two or more drive wheel brakes on the second side of the associated vehicle in mutual coordination.

18. The braking control method according to claim 14, further comprising:
  executing by the processor device anti-lock braking system (ABS) brake control logic stored in the memory device to:
    generate first anti-lock braking system (ABS) signals for effecting ABS braking control over the first brake group of two or more steerable wheel brakes on the first steerable axle of the associated vehicle; and
  selectively interrupting based on the first ABS signals delivery of the pressurized air from the first EPM to the first brake group of two or more steerable wheel brakes on the first steerable axle of the associated vehicle using a first set of two or more pressure control valves (PCVs) in pneumatic communication with the first EPM.

19. The braking control method according to claim 18, further comprising:
  executing by the processor device the ABS brake control logic stored in the memory device to:
    generate second ABS signals for effecting ABS braking control over the second brake group of two or more steerable wheel brakes on the second steerable axle of the associated vehicle; and
  selectively interrupting based on the second ABS signals delivery of the pressurized air from the first EPM o the second brake group of two or more steerable wheel brakes on the second steerable axle of the associated vehicle using a second set of two or more PCVs in pneumatic communication with the first EPM.

20. The braking control method according to claim 14, further comprising:
  executing axle-by-axle braking control logic by the processor device to generate the steerable wheel brake control signal for performing the axle-by-axle braking control of the steerable wheel brakes of the first and second steerable axles of the associated vehicle; and
  executing wheel-by-wheel braking control logic by the processor device to generate the drive wheel brake control signal for performing the wheel-by-wheel braking control of the drive wheel brakes of the plurality of drive axles of the associated vehicle.

21. The braking control method according to claim 13, wherein:
  the effecting axle-by-axle braking control of steerable wheel brakes of the first and second steerable axles comprises:
    selectively delivering the pressurized air to the first brake group of two or more steerable wheel brakes on the first steerable axle of the associated vehicle separately from selectively delivering the pressurized air to the second brake group of two or more steerable wheel brakes on the second steerable axle of the associated vehicle for effecting the axle-by-axle braking control of the steerable wheel brakes of the first steerable axle of the associated vehicle separately from effecting the axle-by-axle braking control of the steerable wheel brakes of the second steerable axle of the associated vehicle.

22. The braking control method according to claim 13, wherein:
  the effecting axle-by-axle braking control of steerable wheel brakes of the first and second steerable axles comprises:

simultaneously selectively delivering the pressurized air to the first brake group of two or more steerable wheel brakes on the first steerable axle of the associated vehicle separately from selectively delivering the pressurized air to the second brake group of two or more steerable wheel brakes on the second steerable axle of the associated vehicle for simultaneously effecting the axle-by-axle braking control of the steerable wheel brakes of the first steerable axle of the associated vehicle separately from effecting the axle-by-axle braking control of the steerable wheel brakes of the second steerable axle of the associated vehicle.

\* \* \* \* \*